United States Patent [19]
Kuechler et al.

[11] Patent Number: 5,324,572
[45] Date of Patent: Jun. 28, 1994

[54] MULTILAYER LAMINATED FILM HAVING AN IMPROVED GAS BARRIER ACTION

[75] Inventors: Manfred Kuechler, Oberursel; Guenter Reinhard, Frankfurt/Main, both of Fed. Rep. of Germany

[73] Assignee: Hoechst Aktiengesellschaft, Fed. Rep. of Germany

[21] Appl. No.: 911,913

[22] Filed: Jul. 10, 1992

[30] Foreign Application Priority Data

Jul. 12, 1991 [DE] Fed. Rep. of Germany ....... 4123127

[51] Int. Cl.$^5$ ................................................. B32B 7/02
[52] U.S. Cl. ..................................... 428/215; 428/515; 428/518; 428/473.5; 428/910
[58] Field of Search ............... 428/515, 518, 215, 520, 428/473.5, 911 O

[56] References Cited

U.S. PATENT DOCUMENTS 4,239,826 12/1980 Knott et al. .

FOREIGN PATENT DOCUMENTS 0050288 10/1981 European Pat. Off. .
8214634 5/1982 Fed. Rep. of Germany .
2118864 4/1983 United Kingdom .

*Primary Examiner*—Edith Buffalow
*Attorney, Agent, or Firm*—Bierman and Muserlian

[57] ABSTRACT

Production or multilayer laminated films which can be subjected to thermoplastic shaping and have an improved gas barrier action, consisting of at least one gas barrier film based on highly hydrolyzed, plasticizer-containing polyvinyl alcohol with, on one side or both sides, covering films of plastic which are insoluble in water, impermeable to water and water vapor and if appropriate insoluble in organic solvents and which are laminated to the gas barrier film over the entire surface by means of special adhesive layers which have pressure-sensitive adhesive properties. The adhesive layers consist of copolymers having a glass transition temperature $T_G$ in the range from $-50°$ to $-10°$ C. The gas barrier film can be produced by extrusion blow molding. The blown film bubble is cut open and coated, at room temperature as a flat film, with the adhesive layer on both sides via applicator rolls, dried and deshrunk by conditioning. The resulting self-adhesive gas barrier film is then laminated with covering films of plastic by means of laminating rolls or on a calender to give a multilayer film laminate which is practically impermeable to water and gas and if appropriate solvent-tight.

Use of the multilayer laminated films for water- and gas-tight, in particular oxygen-tight, water vapor-tight, aroma-tight and if appropriate solvent-tight packaging or wrapping of various products.

8 Claims, No Drawings

MULTILAYER LAMINATED FILM HAVING AN IMPROVED GAS BARRIER ACTION

The invention relates to multilayer laminated films which can be subjected to thermoplastic shaping and have an improved gas barrier action, consisting of at least one gas barrier film based on polyvinyl alcohol (PVAL) with covering films of plastic which are water-insoluble and if appropriate insoluble in organic solvents on at least one side, preferably on both sides, the latter being laminated onto the gas barrier films over their entire surface on at least one side, preferably on both sides, by means of special adhesive layers. The gas barrier films contain highly hydrolyzed PVAL and the multilayer laminated films have, compared with the prior art, an improved gas barrier action, in particular against oxygen and against aroma substances, and advantageous mechanical properties.

Multilayer laminated films having good gas barrier properties are already known and are used in various instances as packaging films. They preferably comprise, as gas barriers, films based on ethylene/vinyl alcohol copolymers with water-insoluble covering films (cf., for example, EP-PS 0 118 060). Their gas barrier action, for example against oxygen, is usually poorer than 5 cm$^3$/m$^2$.d.bar at 93% relative atmospheric humidity, measured in accordance with DIN 53380, which is unsatisfactory for numerous uses.

Multilayer laminated films are in general produced by the coextrusion process, the coextruded individual films being laminated to give the desired film laminates using adhesion promoters, such as, for example, ionomers or modified polyolefins.

The use of customary polyvinyl alcohol (PVAL) as a gas barrier film is likewise already known and can lead to better gas barrier actions than, for example, the use of the abovementioned, relatively expensive ethylene/vinyl alcohol copolymers. However, the latter can be extruded and coextruded easily without additions of plasticizer, in contrast to customary PVALs, which can be subjected to thermoplastic shaping and extrusion only with difficulty and with considerable additions of plasticizer. Moreover, PVAL films cannot be subjected to thermoplastic bonding or lamination with customary water-insoluble covering films of non-polar polymers, for example polyolefins, such as polyethylene or polypropylene, or with polyvinyl chloride or polyvinylidene chloride without using adhesion bridges, so that film laminates with PVAL films have hitherto become available only in isolated cases. A specific extrusion process for the production of sheet-like structures and multilayer elements, such as, for example, photopolymeric printing plates, based on partly hydrolyzed PVALs having degrees of polymerization $\overline{DP}_W$ of 250 to 3000 is thus known from EP-PS 0 080 664. partly hydrolyzed polyvinyl acetates having degrees of hydrolysis of 80 to 82 mol % and degrees of polymerization $\overline{DP}_W$ of 200 to 500 are preferably used here both for photopolymeric printing plates and for other purposes. They are subjected to thermoplastic processing directly in a twin-screw extruder, without prior separate preplasticization, and the resulting PVAL film is also said to be suitable for the production of laminates or laminated sheets. For this purpose, another film, for example of another plastic, or a metal sheet is said to be laminated onto one or both sides of the PVAL film, without an intermediate layer, on a roll mill. However, it has been found that n satisfactory intimate adhesion between the PVAL film and the film of another plastic laminated on can be achieved in this manner, and furthermore also practically no substantial improvement in the gas barrier action, compared with the known prior art, can be obtained with partly hydrolyzed PVALs. Partly hydrolyzed PVALs are therefore not particularly suitable as a gas barrier film material and the gas barrier action of their films moreover deteriorates considerably on absorption of water.

The invention was thus based on the object of providing multilayer laminated films which have an improved gas barrier action, using inexpensively accessible PVAL as the gas barrier films, and which do not have the disadvantages described and can be produced easily and cheaply.

It has now ben found, surprisingly, that a noticeable increase in he gas barrier action can be achieved by using highly hydrolyzed PVALs in gas barrier films, and that an initiate bonding of PVAL gas barrier films and water-insoluble covering films of plastic can be achieved by laminating the latter onto the PVAL film using special water-insoluble pressure-sensitive adhesive layers. The use of plasticzer-containing extruded blown films of highly hydrolyzed PVALs having average degrees of polymerization $\overline{DP}_W$ of 1500 is particularly preferred here.

The invention therefore relates to multilayer laminated films which can be subjected to thermoplastic shaping and have an improved gas barrier action, consisting of at least one gas barrier film based on PVAL which is laminated on one or both sides with a polymer film which is water-insoluble and if appropriate insoluble in organic solvents as a barrier layer against water and water vapor, it also being possible for the multilayer laminated films to comprise several identical or different gas barrier films having intermediate layers of polymer films which block water and water vapor, wherein the gas barrier film comprises highly hydrolyzed PVAL and is laminated on one or both sides, preferably on both sides, with the polymer film(s) which block(s) water and water vapor and s/are water-insoluble and if appropriate insoluble in organic solvents via an adhesive layer which has pressure-sensitive adhesive properties and is impermeable to water and water vapor.

The gas barrier film preferably has a layer thickness in the range from 10 to 100 μm, in particular 40 to 60, particularly preferably 45 to 55 μm. It preferably contains highly hydrolyzed PVAL, which has an ester number of <10 mg of KOH/g, a degree of hydrolysis of >98 mol %, a residual acetyl group content of <1% by weight and preferably an average $\overline{DP}_W$ of >1500, in each case based on the PVAL. The gas barrier film furthermore preferably contains up to 50% by weight, in particular 12-20% by weight, of an aliphatic C$_2$- to C$_5$-polyol or oligomeric poly(C$_2$–C$_6$)-alkylene glycol ether-polyols, preferably glycerol, as PVAL plasticizers, where the plasticizer should preferably comply with the specifications for foodstuffs packagings, if appropriate up to 5% by weight of water, if appropriate up to 12% by weight of a flow auxiliary and if appropriate preferably up to 1% by weight of an antiblocking agent, in each case based on the PVAL.

The gas barrier film is preferably a plasticizer-containing PVAL extruded blown film which has been subjected to thermoplastic shaping by known methods and has contents of 5 to 50% by weight, preferably 12–20% by weight, of aliphatic C$_2$–C$_6$-polyols or oligomeric poly($C_2$–$C_5$)-alkylene glycol ether-polyols, preferably glycerol, as the plasticizer and up to 5% by weight of water, in each case based on the PVAL, and if appropriate other processing auxiliaries, such as, for example, flow auxiliaries and antiblocking agents. After the PVAL extruded blown film has been produced and before it is further processed to laminated films, it is necessary for it to be deshrunk by conditioning at 80° C. in the customary manner and, in the case of higher water contents, to reduce these to a value of <5% by weight of $H_2O$, based on the PVAL, by drying.

Possible starting PVALs for the production of gas barrier films to be used according to the invention are, preferably, highly hydrolyzed, high molecular weight PVAL types having hydrolysis numbers of preferably >98 to 100 mol %, such as are obtainable, for example, by hydrolysis or alcoholysis of high molecular weight polyvinylcarboxylic acid esters, preferably polyvinyl acetate or polyvinyl propionate, particularly preferably polyvinyl acetate. Suitable commercially available PVAL types are, for example, the ®Mowiol types 20–98, 28–99, 56–98 and 66–100 from Hoechst AG. Mowiol 28–99 and 66–100 are particularly preferred. The PVALs are preferably subjected to thermoplastic processing in the form of plasticizer-containing so-called dry blends which have been preplasticized externally. Dry blends are understood as meaning the mixtures of PVAL, plasticizer, water, flow auxiliary and antiblocking agent which have been preplasticized and pregranulated in a separate working operation at temperatures of up to 120° C., for example in a positive mixer, and which can be extruded and shaped to extruded blown films without problems, the contents of plasticizer and water being such that the melting temperature of the dry blend is always below the decomposition temperature of the PVAL, so that no thermal decomposition of the PVAL can occur during extrusion (cf., for example, EP-OS 0 004 587). The dry blends preferably contain 2 to 20% by weight, in particular 7 to 12% by weight, of polymer powder of preferably water-insoluble polymers, in particular spray-dried dispersible polyvinyl acetate powder (for example ®Mowilith powder DS, a polyvinyl acetate powder from Hoechst AG which can be redispersed in water), as a flow auxiliary and preferably 0.1 to 1% by weight, in particular 0.3 to 0.9% by weight, in each case based on the PVAL, of highly disperse silicic acid (for example ®Aerosil from Degussa) or stearic acid as an antiblocking agent. After their production and before their further processing according to the invention to form gas barrier films, the plasticizer-containing PVAL films obtainable from the dry blends by extrusion blowing are preferably brought to a water content of <5% by weight, based on the PVAL, by drying and furthermore deshrunk by conditioning, for example at 80° C.

Glycerol and combinations of glycerol and water, in particular, are used as plasticizers for the PVAL. Suitable plasticizers are furthermore compounds, or mixtures thereof or combinations thereof with water or combinations thereof with glycerol and water, preferably chosen from the group comprising heat-stable aliphatic igomeric ethers of ($C_2$–$C_5$)-diols having preferably up to 10 alkylene oxide base units in the molecule, in particular ($C_2$–$C_6$)-alkylene glycols or ($C_2$–$C_5$)-alkanediols, preferably oligomeric ethers of ethylene glycol, propylene glycol, butylene glycol or mixed ethers of these glycols, in particular diethylene glycol, triethylene glycol, tetraethylene glycol and pentaethylene glycol. Simple non-etherified ($C_2$–$C_6$)-alkylene glycols or ($C_2$–$C_5$)-alkanediols, in particular ethylene glycol, propylene glycol and butylene glycol, can also be used.

Instead of using PVAL dry blends, pulverulent or granular PVAL can also be mixed and plasticized directly with the required amounts of plasticizer, water, and if appropriate flow auxiliary, and if appropriate antiblocking agent, in an appropriately designed extruder, preferably, for example, a twin-screw extruder, or in a suitable mixing and plasticizing device upstream of the extruder, and the melting temperature of the mixture can thus be brought to below the decomposition temperature of the PVAL. However, in the case of highly hydrolyzed and high molecular weight PVALs, the use of plasticizer-containing PVAL dry blends which have been preplasticized externally is preferred The films are preferably produced by means of a single-screw blow-molding extruder with a venting device, into which the plasticizer-containing PVAL dry blend is metered, and the resulting blown film tube, after being cooled to room temperature and cut open in the longitudinal direction, is passed over a film collapsing device and then coated on both sides with the pressure-sensitive adhesive layer on applicator rolls. The pressure-sensitive adhesive layer is then dried in a drying tunnel, where the gas barrier film and the pressure-sensitive adhesive layers are dried and the film is deshrunk simultaneously at elevated temperature. The self-adhesive gas barrier film thus obtained is then laminated at room temperature on both sides, by means of laminating rolls or on a calender, with covering films of plastic which are water-insoluble and block water and water vapor to give a multilayer film laminate which is impermeable o water and gas, and, if covering films of plastic which are insoluble in organic solvents are used, is also impermeable to solvents. If appropriate, the gas barrier film is laminated on only one side with a covering film of plastic which is water-insoluble and blocks water and water vapor and if appropriate is insoluble in solvents, and the pressure-sensitive adhesive layer on the other side of the gas barrier film is covered with a siliconized paper web which can be peeled off (release paper), so .hat the film laminate can be used later, after the covering paper has been peeled off, to produce laminates and laminated sheets by simple lamination onto corresponding substrates. It is also possible for the gas barrier film which has been coated on both sides with pressure-sensitive adhesive layers to be temporarily covered on both sides with siliconized release paper or covering paper until it is used later for multilayer film lamination.

The adhesive layer having pressure-sensitive adhesive properties, abbreviated to pressure-sensitive adhesive layer above and below, preferably consists of a copolymer, the glass transition temperature $T_G$ of which, measured by means of differential thermal analysis (DTA), is in the range from −50 to −10° C. and which, in the form of a cohesive layer, is water-insoluble and impermeable to water and largely to impermeable to water vapor. It is preferably applied to one or, preferably, both sides of the gas barrier film comprising the PVAL, and in particular by spraying, rolling or knife-coating of copolymer solutions in organic solvents or of aqueous copolymer dispersions or of copolymer melts, by the hot melt process, and if appropriate subsequent drying of the adhesive layers, the solvent or the water being evaporated, it being possible for the drying to be carried out simultaneously in combination with the deshrinking conditioning of the plasticizer-containing PVAL blown film, for example at 80° C. The layer thicknesses of the pressure-sensitive adhesive layers are preferably in the range from 20 to 50 μm, in particular 30 to 40 μm.

The pressure-sensitive adhesive layers which are used according to the invention are preferably pure acrylate copolymers, which preferably comprise, as the essential components, monomer units of acrylic acid esters and/or methacrylic acid esters, and furthermore preferably up to 10% by weight of monomer units of an ethylenically unsaturated $C_3$- to $C_5$-monocarboxylic acid amide and preferably up to 5% by weight of monomer units of an ethylenically unsaturated $C_3$- to $C_5$-monocarboxylic acid, in each case based on the copolymer, or substances which are likewise preferably used are vinyl ester/acrylate copolymers which comprise, as essential components, preferably monomer units of vinyl esters and acrylic acid esters or/and methacrylic acid esters and preferably up to 5% by weight of monomer units of ethylenically unsaturated $C_3$- to $C_5$-monocarboxylic acids, in each case based on the copolymer, the glass transition temperature $T_G$ of the copolymers in all cases being in the range from −50 to −10° C.

The pure acrylate copolymers comprise, as monomer units, preferably 70 to 85% by weight, in particular 75-82% by weight, of acrylic acid ($C_4$-$C_{10}$)-alkyl ester, 5 to 20% by weight, in particular 8-17% by weight, of methacrylic acid ($C_1$-$C_3$)-alkyl ester, 3 to 10% by weight, in particular 4-8% by weight, of ethylenically unsaturated ($C_3$-$C_5$)-monocarboxylic acid amide and 0 to 5% by weight, in particular 0.1-3% by weight, of ethylenically unsaturated ($C_3$-$C_5$)-monocarboxylic acid.

The viscosity of the pure acrylate copolymers is in the range from 20 to 80 Pa.s, preferably 35 to 50 Pa.s, measured on the copolymer melts at 180° C., and the glass transition temperature $T_G$ is in the range from −50 to −10°.

Acrylic acid ($C_4$-$C_{10}$)-alkyl esters which are used are those having a linear or branched alkyl radical, preferably butyl, pentyl, hexyl, octyl, tert-octyl, amyl, tertamyl, 2,2-dmethylbutyl, 3,3-dimethylbutyl or 4-ethylhexyl acrylate. Methacrylic acid ($C_1$-$C_3$)-alkyl esters which are preferably used are methyl, ethyl and propyl methacrylate.

Ethylenically unsaturated ($C_3$-$C_5$)-monocarboxylic acid amides which are preferably used are acrylamide, methacrylamide, crotonamide or vinylacetamide.

Ethylenically unsaturated ($C_3$-$C_5$)-monocarboxylic acids which are preferably used are acrylic acid, methacrylic acid, crotonic acid or vinylacetic acid.

The pure acrylate copolymers can be prepared by copolymerization, initiated by free radicals, of the monomers by known methods, preferably in organic solvents. The copolymers can be obtained by this process directly as solutions or, after elimination of the solvent, as a solid resin.

The vinyl ester/acrylate copolymers preferably comprise, as monomer units, 8 to 30% by weight, in particular 9.5-15% by weight, of ($C_2$-$C_4$)-monocarboxylic acid vinyl ester, 60 to 91% by weight, in particular 80-90% by weight, of acrylic acid ($C_4$-$C_{10}$)-alkyl ester and 0 to 10% by weight, in particular 0.1-5% by weight, of ethylenically unsaturated ($C_3$-$C_5$)-monocarboxylic acid.

($C_2$-$C_4$)-Monocarboxylic acid vinyl esters which are preferably used are vinyl acetate, vinyl propionate or vinyl butyrate.

Acrylic acid ($C_4$-$C_{10}$)-alkyl esters which are preferably used are 2,2-dimethylbutyl, 3,3-dimethylbutyl, 2-ethylhexyl or, in particular, butyl acrylate.

Ethylenically unsaturated ($C_3$-$C_5$)-monocarboxylic acids which are preferably used are acrylic acid, methacrylic acid, crotonic acid or vinylacetic acid.

The vinyl ester/acrylate copolymers can be prepared by copolymerization, initiated by free radicals, of the monomers by known methods, preferably in aqueous dispersion, aqueous copolymer dispersions having solids contents of preferably 35 to 60% by weight, in particular 40 to 55% by weight, based on the aqueous dispersion, being obtained. The viscosities of the aqueous vinyl ester/acrylate copolymer dispersions are in the range from 0.1 to 3 Pa.s, preferably 0.2 to 1.5 Pa.s, measured at 23° C. in accordance with DIN 53019 in a Contraves rheometer STV The glass transition temperature $T_G$ of the vinyl ester/acrylate copolymers is in the range from −50 to −10° C.

Commercially available pure acrylate copolymers which are preferably suitable according to the invention for the production of pressure-sensitive adhesive layers are, for example, the ®Synthacryl types VSC 2291 (solid copolymer) and VSC 1292 (60% strength by weight copolymer solution in isobutanol) from HOECHST AG. Both products comprise copolymers of acrylic acid esters having a glass transition temperature $T_G$ of −45° C. Suitable solvents for solid copolymers are, in particular, esters, alcohols, ketones, ethers and hydrocarbons, such as, for example, ethyl acetate, propyl acetate, butyl acetate, acetone, methyl ethyl ketone, ethanol, propanol, isopropanol, butanol, isobutanol, amyl alcohol, dioxane, tetrahydrofuran, halohdrocarbons, such as methylene chloride, trichloroethylene, perchloroethylene and carbon tetrachloride, and hydrocarbons, such as pentane, hexane, cyclohexane, toluene and xylene.

A commercially available vinyl ester/acrylate copolymer in aqueous dispersion form which is preferably suitable is, for example, Mowilith LDM 5650, approximately 55% strength by Weight, from HOECHST AG, an acrylic acid ester/vinyl acetate copolymer dispersion containing carboxyl groups. The glass transition temperature $T_G$ of the copolymer is −32° C.

Water-insoluble covering films of plastic which are impermeable t water and water vapor and are preferably used are customary polyolefin films which are also insoluble in organic solvents at the usual room temperature, such s, for example, films of polyethylene or polypropylene, or films of polyamide, polyvinyl chloride, polyvinylidene chloride, polycarbonate or polyethylene terephthalate, in particular biaxially oriented polypropylene films. The film thickness of the covering films of plastic is preferably in the range from 10 to 50 μm, in particular 25 to 35 μm. Biaxially oriented polypropylene films of 30 μm thickness, in particular those of which the surface of the adhesive contact side has been partly oxidized and in this way rendered less hydrophobic by electric corona treatment, are particularly preferred. A biaxially oriented commercially available polypropylene film material which can be mentioned as preferably suitable is, for example, ®Trespaphan from HOECHST AG. It can be advantageous in some cases for the pressure-sensitive adhesive layer to be applied on one side of the water-insoluble covering films of plastic instead of on both sides of the gas barrier film and for the film layers to be laminated in an analogous manner to form laminates. Corona treatment of the adhesive side of the covering film before application of the pressure-sensitive adhesive layer, preferably when polyolefin films are used, can be particularly advantageous and important here.

The covering films of plastic can advantageously be laminated with the gas barrier films carrying pressure-sensitive adhesive layers by means of laminating rolls or on calenders at room temperature, nip pressures of preferably 3 to 12 bar, in particular 5 to 10 bar, being used.

Multilayer laminated films according to the invention preferably consist of at least one gas barrier layer which comprises highly hydrolyzed PVAL, carries pressure-sensitive adhesive layers on both sides and is laminated on each side with a covering film of plastic, it being possible for the covering films to be identical or different. It can be advantageous in some cases for these multilayer laminated films to be laminated on one side or on both sides with another gas barrier film, which is provided on both sides with pressure-sensitive adhesive layers, one side of which carries a covering film of plastic, and to obtain in this way multilayer laminated films having two or three or if appropriate more gas barrier film.

The total thickness of multilayer laminated films according to the invention is preferably in the range from 100 to 500 $\mu$m, in particular 170 to 220 $\mu$m.

The permeability to oxygen of multilayer laminated films according to the invention is preferably <2 cm$^3$/m$^2$.d.bar at 93% relative atmospheric humidity, measured in accordance with DIN 53380, and 0.3 cm$^2$/m$^2$.d.bar at 53% relative atmospheric humidity. Multilayer laminated films according to the invention can be transparent to opaque, and pigmented or dyed in a translucent or opaque manner, for example if pigments, which may be colored, or dyestuffs, if appropriate, are incorporated into the gas barrier film. The multilayer laminated films according to the invention can be subjected to thermoplastic shaping, preferably into containers, in particular film bags, processing, welding or sealing and can be preprinted both externally and, indelibly protected, on the surfaces of internal layers.

The multilayer laminated films according to the invention can advantageously be used for water- and gas-tight, in particular oxygen-tight, water vapor-tight, aroma-tight and if appropriate solvent-tight packaging or wrapping of a wide range of products, such as, for example, foodstuffs, in particular, for example, oxygen-sensitive products, such as meat and sausage products, fish, coffee, mayonnaises, edible oils, vitamins, deep-frozen food, drinks, spices, flavorings, cosmetics, pharmaceuticals, chemicals, if appropriate organic solvents, such as, for example, petroleum spirit, benzene, esters, ethers, ketones and mineral oils, and fats, and as a ripening container lining for fresh fruit and produce.

The invention is illustrated in more detail by the following examples.

EXAMPLE 1

A) Production of a Plasticizer-containing PVAL Gas Barrier Film with a Pressure-sensitive Adhesive Coating on Both Sides Plasticizer-containing preplasticized PVAL dry blend granules are prepared in a positive mixer analogously to Example 5 of EP-OS 0 004 587 from the following components:

100 parts by weight of Mowiol 28-99[1)]

[1)]Mowiol 28-99 is a commercially available, granulated, highly hydrolyzed PVAL of DP$_W$ 2000, the degree of hydrolysis of which is 99.4 mol %, the ester number of which is 8 mg of KOH/g, the residual acetyl content of which is 0.5% by weight and the viscosity of a 4% strength aqueous solution of which at 20° C. is 28 mPa.s, measured in accordance with DIN 53015.

180 parts by weight of glycerol
100 parts by weight of water
100 parts by weight of Mowilith powder DS[2)]

[2)]Mowilith powder DS is a homopolymeric polymer powder of polyvinyl acetate which is redispersible in water and is prepared by spray during an aqueous polyvinyl acetate dispersion.

6 parts by weight of Aerosil[3)]

[3)]Aerosil is a highly disperse, synthetically prepared silicic acid powder of large specific surface area.

The resulting plasticizer-containing, preplasticized PVAL dry blend granules are processed in a single-screw blow molding extruder with a venting device at customary temperatures and in the customary manner to form a defect-free blown film having a thickness of 45 $\mu$m and a tube circumference of about 160 cm, the tube is cut open in the longitudinal direction, after cooling to room temperature, and the resulting film about 160 cm wide is passed over a film collapsing device to a coating device for application on both sides of the pressure-sensitive adhesive layers. In the coating device, the film passes through a pair of applicator rolls, uniform application of an adhesive layer in the form of an aqueous plastics dispersion being effected on both sides. Undiluted Mowilith LDM 5650, about 55% strength by weight, an acrylic acid ester/vinyl acetate copolymer dispersion which contains carboxyl groups and in which the copolymer content has a glass transition temperature $T_G$ of −32° C., is used as the plastics dispersion. In a subsequent drying tunnel, the dispersion layer is dried and the water content in the film is removed down to less than 5% by weight of H$_2$O, based on the PVAL, and at the same time the film is deshrunk by heat treatment at 80° C.

B) Production of a Multilayer Laminated Film Having Gas Barrier Properties

The deshrunk, plasticizer-containing PVAL gas barrier film which leaves the drying tunnel according to Example 1A and is coated on both sides with self-adhesive coatings of in each case pressure-sensitive adhesive layers about 35 $\mu$m thick is cooled to room temperature and laminated on both sides, on a calender, with commercially available Trespaphan film, a water-insoluble, biaxially stretched polypropylene film 30 $\mu$m thick which is additionally corona-treated on the laminated side and is insoluble in organic solvents at room temperature, a nip pressure of 6 bar being used. The resulting multilayer laminated film has a thickness of about 170 $\mu$m. It is transparent, soft, of average flexibility, can be subjected to thermoplastic shaping and welding and is sealable and printable. Its permeability to oxygen, measured in accordance with DIN 53380, is 0.2 cm$^3$/m$^2$.d.bar at 53% relative atmospheric humidity and 1.4 cm$^3$/m$^2$.d.bar at 93% relative atmospheric humidity. In the measurement parameter for the permeability to oxygen, $cm^3$ is the amount of oxygen allowed through, $m^2$ is the film surface in square meters, d is the measurement period in days and bar is the partial pressure of $O_2$.

We claim:

1. A multilayer laminated film which can be subjected to thermoplastic shaping and has an improved gas barrier action, consisting of at least one gas barrier film based on polyvinyl alcohol (PVAL) which is laminated on at least one side with a polymer film which is water-insoluble and optionally insoluble in organic solvents as a barrier layer against water and water vapor, optionally for the multilayer laminated film to comprise several identical or different gas barrier films having intermediate layers of polymer films which block water and water vapor, wherein the gas barrier film comprises highly hydrolyzed PVAL and is laminated on at least one side with the polymer film(s) which block(s) water and water vapor and is/are water-insoluble and optionally insoluble in organic solvents via an adhesive layer which has pressure-sensitive adhesive properties and is impermeable to water and water vapor.

2. A multilayer laminated film as claimed in claim 1, wherein the gas barrier film has a layer thickness in the range from 10 to 100 μm and comprises PVAL which has an ester number of < 10 mg of KOH/g, a degree of hydrolysis of > 98 mol %, a residual acetyl group content of < 1% by weight and an average $\overline{DP}_W$ of > 1500, in each case based on the PVAL.

3. A multilayer laminated film as claimed in claim 1, which contains, as gas barrier films, plasticizer-containing PVAL extruded blown films which have been produced from preplasticized, plasticizer-containing PVAL dry blends by extrusion and have contents of 5 to 50% by weight of aliphatic $C_2$- to $C_6$-polyols or oligomeric poly($C_2$–$C_6$)-alkylene glycol ether-polyols as plasticizer and up to 5% by weight of water and up to 12% by weight of flow auxiliary and up to 1% by weight of antiblocking agent, in each case based on the PVAL.

4. A multilayer laminated film as claimed in claim 1, in which the pressure-sensitive adhesive layers are applied, before production of the film laminate, to at least one side of the gas barrier films as a solution in an organic solvent or as an aqueous dispersion by spraying, rolling or knife-coating, or in bulk by the hot melt process, and are dried and the gas barrier films are deshrunk by heat treatment at not less than 80° C.

5. A multilayer laminated film as claimed in claim 1, which comprises as pressure-sensitive adhesive layers, at least one member of the group consisting of pure acrylate copolymers and vinyl ester/acrylate copolymers, the glass transition temperature $T_g$ of which is in each case in the range from −50 to −10° C.

6. A multilayer laminated film as claimed in claim 1, which comprises, as the water-insoluble polymer films which block water and water vapor, polypropylene films, which can be oriented biaxially and insoluble in organic solvents at room temperature, polyvinylidene chloride films or polyamide films.

7. A multilayer laminated film as claimed in claim 1, in which the total thickness is in the range from 100 to 500 μm and which can be transparent to opaque, and pigmented or dyed or printed in a translucent or opaque manner.

8. A multilayer laminated film as claimed in claim 1, which has an oxygen permeability, measured in accordance with DIN 53380, at 93% relative atmospheric humidity of > 2 $cm^3/m^2 \cdot d \cdot bar$.

* * * * *